US005518784A

United States Patent [19]

Fussell

[11] Patent Number: 5,518,784

[45] Date of Patent: May 21, 1996

[54] ANIMATED DECORATIVE ORNAMENT

[76] Inventor: David A. Fussell, 9115 June La., Summer Island, St. Augustine, Fla. 32086

[21] Appl. No.: 311,538

[22] Filed: Sep. 23, 1994

[51] Int. Cl.$^6$ .................... B32B 9/00

[52] U.S. Cl. .................... 428/7; 428/11; 428/13; 428/16; 428/19; 428/900; 428/919; 362/86; 362/806; 24/303

[58] Field of Search .................... 428/16, 900, 4, 428/11, 919, 7, 16, 13, 19; 362/86, 806; 160/349.2; 24/303

[56] References Cited

U.S. PATENT DOCUMENTS 4,903,370 2/1990 Erdmann .................... 16/87.2
4,923,721 5/1990 Gilmore .................... 428/11

*Primary Examiner*—Patrick J. Ryan
*Assistant Examiner*—Abraham Bahta
*Attorney, Agent, or Firm*—James A. Hinkle

[57] ABSTRACT

A rotative animated ornament has at least one rotative component and one or more moveable components in moveable relationship to the rotative component. The rotative component can be rotated by an electrical motor, or by any other type of rotative means such as a spring motor, a gas-pressure motor or a prime mover. The one or more moveable components are actuated magnetically by one or more magnetic elements in magnetic relationship to one or more magnetically responsive elements. The magnetic elements and the magnetically responsive elements can be positioned on an ornament holder and/or on the one or more moveable components. Actuation of a moveable component occurs when rotation of the rotative component positions a magnetic element in magnetically responsive nearness to either (a) a magnetically responsive element for magnetic attraction, (b) an opposite pole of another magnetic element for higher magnetic attraction, or (c) a same pole of another magnetic element for magnetic resistance. A magnetic element and a magnetically responsive element or another magnetic element form a magnetic pair. A plurality of moveable components on a rotative component can have a design selection of magnetic pairs. Choice of one or more magnetic pairs depends on direction of movement and on magnetic force of movement desired for design objectives.

9 Claims, 6 Drawing Sheets

FIG. 2
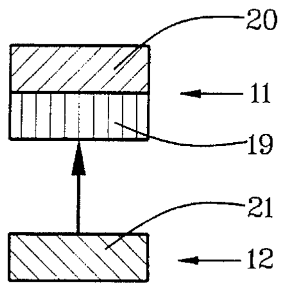
FIG. 3
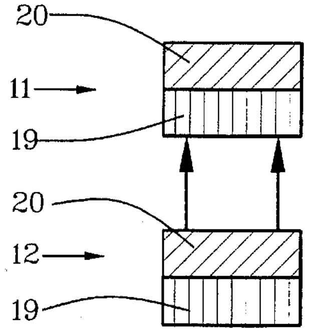
FIG. 4
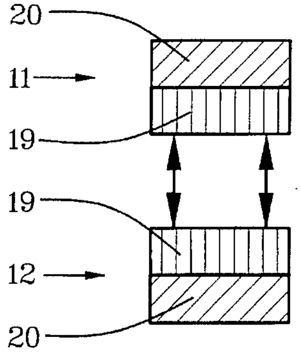
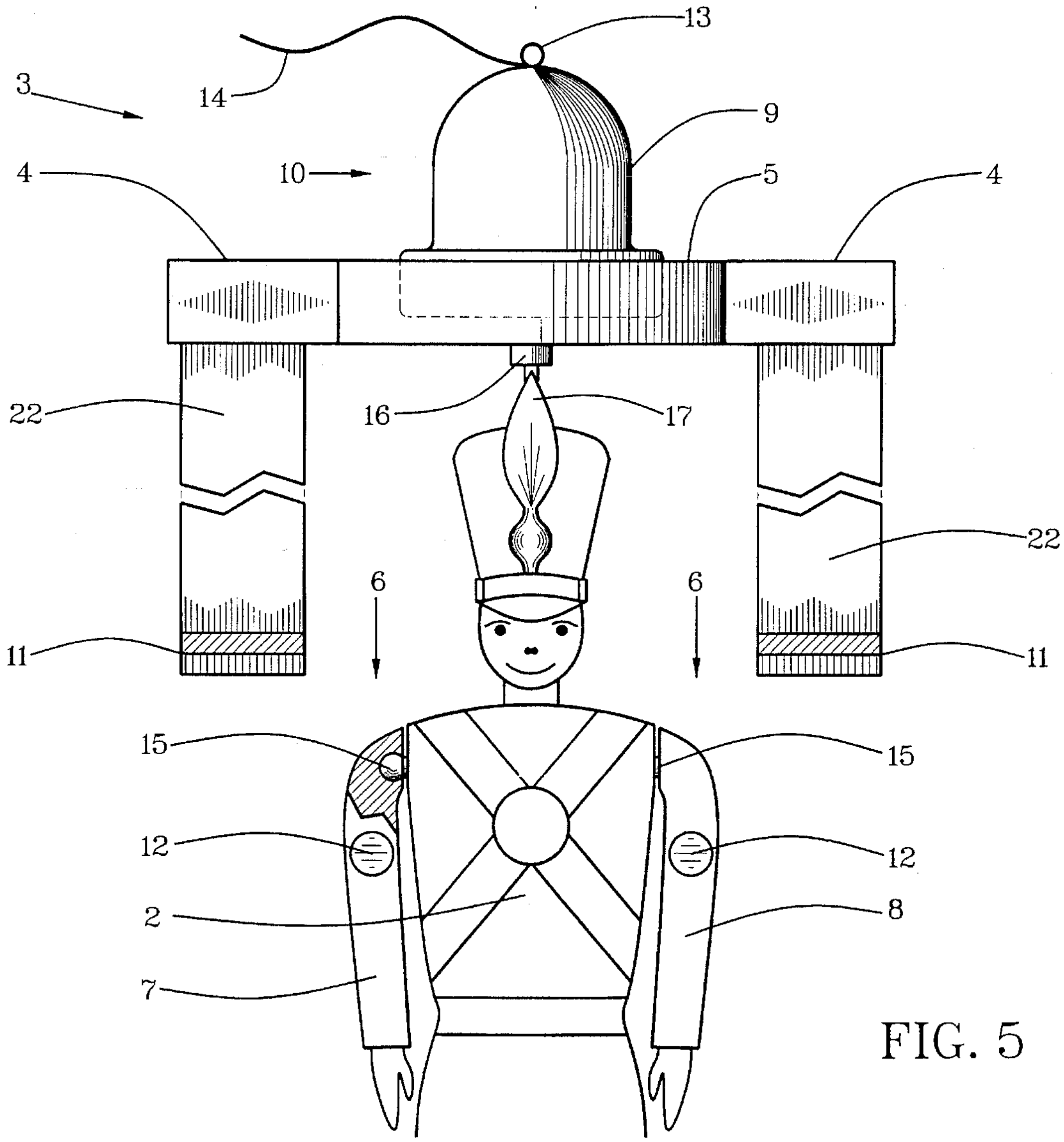
FIG. 5

ANIMATED DECORATIVE ORNAMENT

BACKGROUND OF THE INVENTION

I. Field of the Invention.

The present invention relates generally to the field of rotative ornaments such as Christmas Tree ornaments and in particular to a rotative ornament with components that move, light up and emit sounds in response to magnetic actuation when rotated by a rotative device such as a motor.

II. Description of the Prior Art.

There have been ornaments that are rotated by motive means, such as the ORNAMOTION® electric motor. However, there have been none that employ magnets to actuate components such as legs, arms, heads, lips, instruments, tools and sound emitters of rotating ornaments in a manner taught by this invention.

SUMMARY OF THE INVENTION

In accordance with the present invention, it is contemplated that a hanging ornament or a standing ornament has at least one rotative component and one or more moveable components in moveable relationship to the rotative component. The rotative component can be rotated by an electrical motor, such as the ORNAMOTION®, or by any other type of rotative means such as a spring motor, a gas-pressure motor or a prime mover.

The one or more moveable components are actuated magnetically by one or more magnetic elements in magnetic relationship to one or more magnetically responsive elements. The magnetic elements and the magnetically responsive elements can be positioned on an ornament holder and/or on the one or more moveable components. Actuation of a moveable component occurs when rotation of the rotative component positions a magnetic element in magnetically responsive nearness to either (a) a magnetically responsive element for magnetic attraction, (b) an opposite pole of another magnetic element for higher magnetic attraction, or (c) a same pole of another magnetic element for magnetic resistance.

A magnetic element and a magnetically responsive element or another magnetic element form a magnetic pair. A plurality of moveable components on a rotative component can have a design selection of magnetic pairs. Choice of one or more magnetic pairs depends on direction of movement and on magnetic force of movement desired for design objectives.

Other objects, advantages and capabilities of the invention will become apparent from the following description taken in conjunction with the accompanying drawings showing preferred embodiments of the invention.

BRIEF DESCRIPTION OF THE DRAWINGS

FIG. 2 is a schematic representation of a magnet as a magnetic element in magnetically attractive relationship to a non-magnetized material as a magnetically responsive element;

FIG. 3 is a schematic representation of a magnet as a magnetic element in compounded magnetically attractive relationship to an oppositely poled magnet as a magnetically responsive element;

FIG. 4 is a schematic representation of a magnet as a magnetic element in magnetically resistant relationship to a same-poled magnet as a magnetically responsive element;

FIG. 5 is a sectional view of a top section of the FIG. 1 illustration with the addition of magnet-positioning rods extended downward vertically from the crossbar to position the magnetic elements closer to the magnetically responsive elements;

DESCRIPTION OF THE PREFERRED EMBODIMENTS

Figure 1:
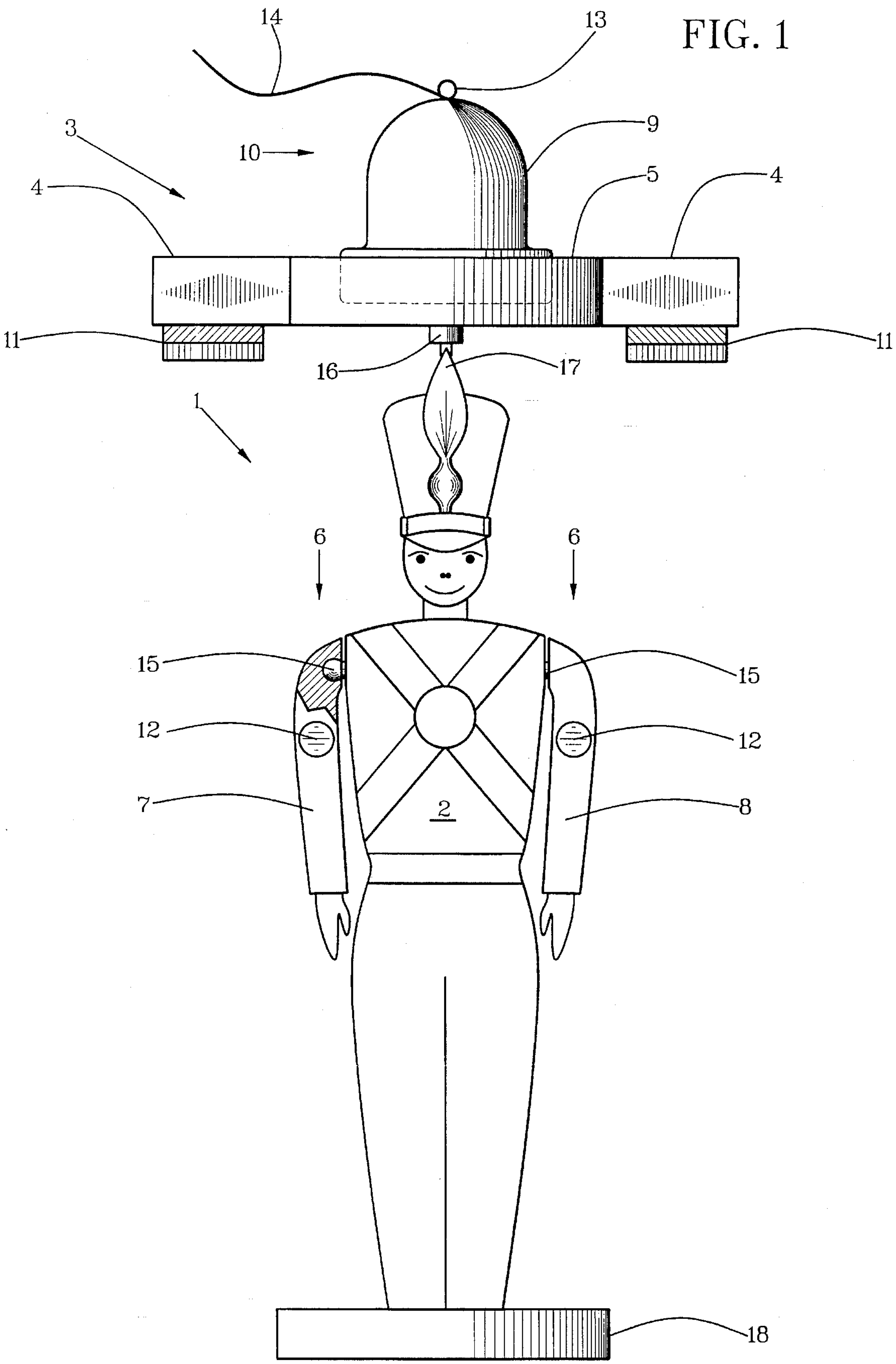
FIG. 1 is an elevation view of an embodiment having a toy soldier as a rotative component suspended rotatively from an ornament holder having an electrical motor as a rotative means and having magnetic elements positioned on a crossbar in designed magnetic relationship to magnetically responsive elements on toy-soldier arms that function as moveable components of an animated rotative ornament.

Referring to the drawings wherein like reference numerals designate corresponding parts throughout the several figures, reference is made first to FIG. 1. A rotative component 1 having a toy soldier 2 as an animated form is attached rotatively to an ornament holder 3 having a crossbar 4 extended laterally from a rotational section 5. At least one moveable component 6 having a form of a first arm 7 and a second arm 8 of the toy soldier 2 is positioned in moveable relationship to the toy soldier 2. An electric motor 9 as a rotative means 10 is attached to the ornament holder 3 in rotation-imparting relationship to the rotative component 1. At least one magnetic element 11 is attachable to the ornament holder 3. At least one magnetically responsive element 12 is attachable to the at-least-one moveable component 6 is desired magnetic relationship to the at-least-one magnetic element 11. This positioning of the magnetic element 11 and the magnetically responsive element 12 can be reversed as explained in relation to FIGS. 2–4.

The ornament holder 3 can be hangable from a desired object with an attachment means 13. The electric motor 9 is powered through an electrical line 14. The arms 7 and 8 are attached pivotally to the toy soldier 2 with pivot rods 15. The electric motor 9 can be countersunk into the rotational section 5. Rotation of the rotative component 1 rotates the entire toy soldier 2 from a rotative axle 16 proximate an emblem peak 17 to a foot base 18.

Referring to FIGS. 2–4, the magnetic element 11 and the magnetically responsive element 12 can have five different combinational pairs of magnetic components. They are (1) magnetic negative-pole-to-non-magnetized material, (2) magnetic positive-pole-to-non-magnetized material, (3) magnetic negative-to-positive poles, (4) magnetic negative-to-negative poles, and (5) magnetic positive-to-positive poles. Either of the components of either of the pairs can be positioned on either the moveable component 6 or the ornament holder 3 shown in FIG. 1, making a total of ten different positional arrangements. Selection of pairs depends on (1) desired magnetic characteristic of either attraction or resistance, (2) strength of magnetic characteristic, (3) weight, (4) distance of magnetic responsiveness, and (5) cost of materials. Positioning of units of the pairs of components depends primarily on weight of units on moveable components 6. A magnetic component can be either a magnetic element 11 or a magnetically responsive element 12, depending on which is a proximal and which is a distal unit in particular structural relationships.

These selections can be simplified and the relevant factors can be best understood by referencing first sides 19 and second sides 20 of unit magnets whether employed as magnetic elements 11 or as magnetically responsive elements 12. This further simplifies matching negative and positive poles of magnets. In this document, magnetic arrangement of poles will be expressed in terms of first sides 19 and second sides 20. Positive and negative poles will not be referenced or otherwise distinguished, except in logical explanations. First sides 19 are proximal starting sides of reference, whether positive or negative, and second sides 20 are distal termination sides that are opposite in polarity from the first sides 19, whether positive or negative. This is because the magnetic effects are the same, regardless of which polarity is a first side 19 and a second side 20. In the drawings, first sides 19 of magnets are crosshatched parallel and second sides 20 are crosshatched at 45 degrees in relation to sides or to ends of magnetic elements 11 and magnetically responsive elements 12.

As shown in FIG. 2, non-magnetized material 21 that is magnetically attractive to either a first side 19 or a second side 20 can be employed optionally as a magnetically responsive element 12. Non-magnetized material 21 so employed is distinguished in the drawings by crosshatching that is 135 degrees in relation to ends or sides of representations in the drawings.

The physical characteristic of magnets that compounds magnetic attraction between oppositely poled magnets in comparison to magnetic attraction between a non-magnetized material and either pole of a magnet is depicted in the FIGS. 2–4 by arrows between magnetic elements 11 and magnetically responsive elements 12. One arrow shown in FIG. 2 between a first side 19 of a magnet of a magnetic element 11 and a non-magnetized material 21 indicates less magnetic attraction than two arrows between first side 19 and second side 20 of oppositely poled magnets of a magnetic element 11 and a magnetically responsive element 12 respectively as shown in FIG. 3. In FIG. 4, two double-direction arrows between a first side 19 of a magnetic element 11 and a first side 19 of a magnetically responsive element 12 in a same-poled pair of magnets indicates high magnetic resistance that is comparable to the magnetic attraction of the FIG. 3 illustration in an opposite direction. These relationships are employed throughout this invention as illustrated in the drawings.

Referring to FIG. 5, magnet-positioning rods 22 can be extended down vertically from the ornament holder 3 or from the crossbar 4 to position magnetic elements 11 closer to magnetically responsive elements 12. Although illustrated as large and possibly unsightly, this is only a function illustration. The magnet-positioning rods 22 can be small and artistically designed to increase instead of decrease attractiveness of this animated rotative ornament. This increases flexibility of design alternatives.

Figure 6:
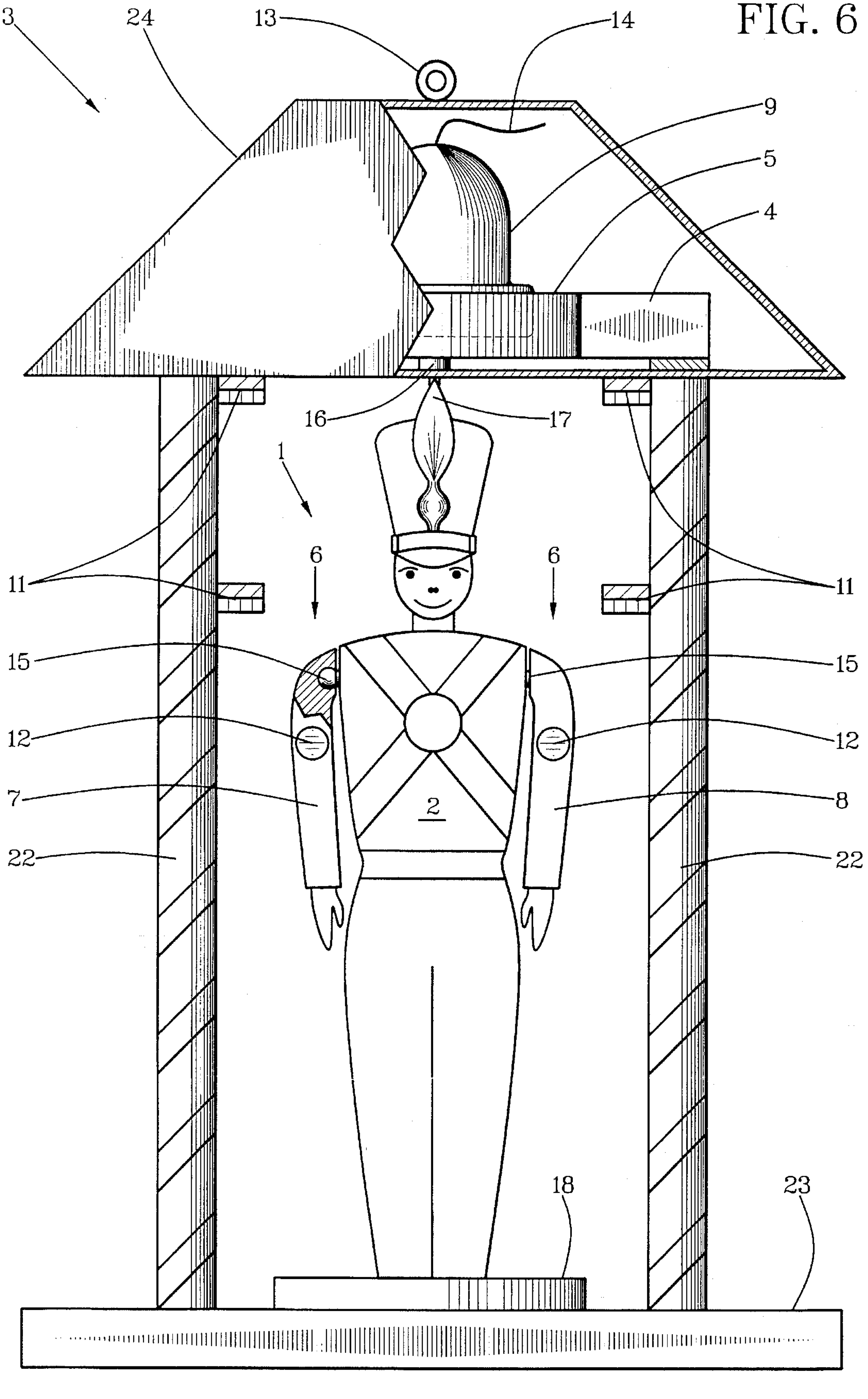
FIG. 6 is an elevation view of an embodiment having both a bottom platform that is standable on a surface and a hanging means from which candy-cane representations are suspended from a top hanging section to hold the bottom platform and having a toy soldier as a rotative component.
Figure 7:
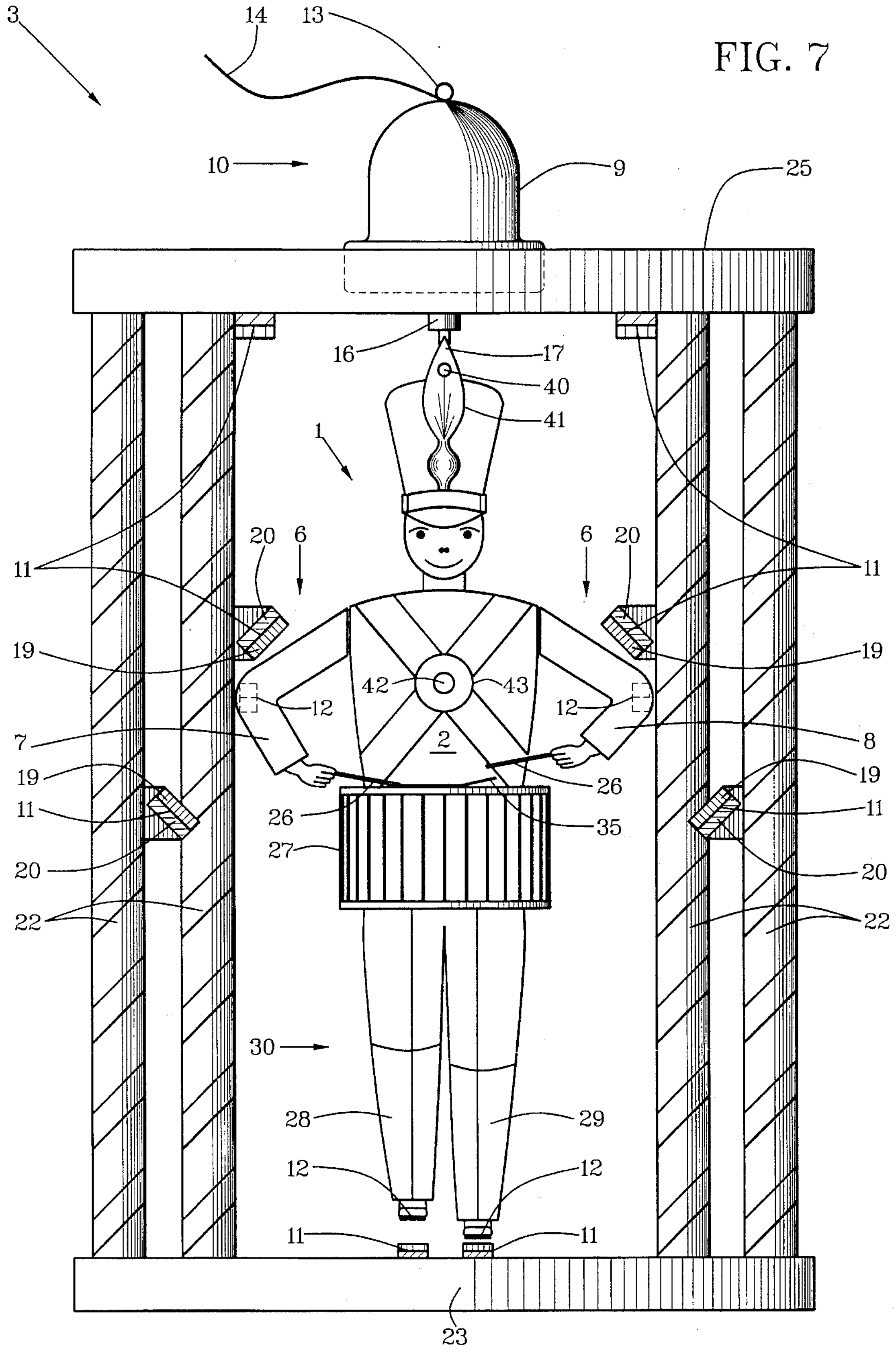
FIG. 7 is an elevation view of the FIG. 6 illustration with the addition of drum-beating arms and marching legs as moveable components, with a different top section and with magnetic elements positioned above and below magnetically responsive elements in the drum-beating arms.
Figure 8:
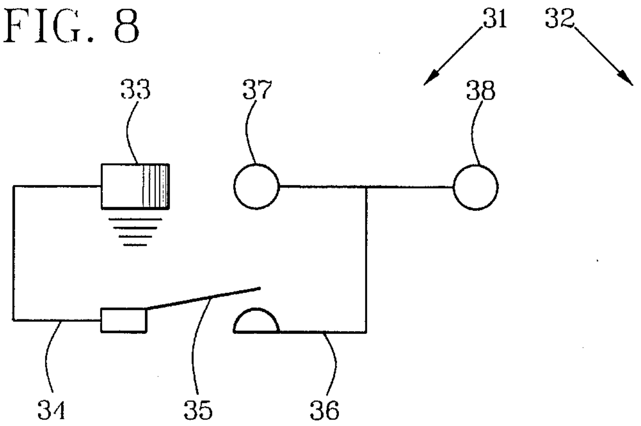
FIG. 8 is a schematic view of an electrical circuit from a miniature battery to an audio device and to a visual device such as a light and having a switch operable by moveable components such as the arms and drum sticks in hands on the arms of the toy soldier.
Figure 9:
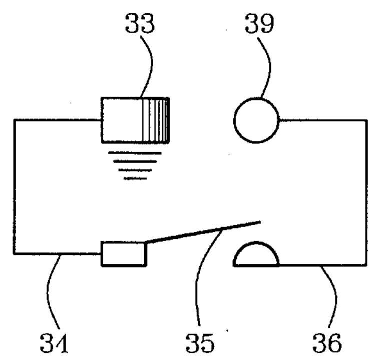
FIG. 9 is a schematic view of an electrical circuit from a miniature battery to a single electrically operated device that can be either an audio device or a visual device and having a switch operable by moveable components such as the arms and drum sticks in hands on the arms of the toy soldier.

In FIG. 6, the magnet-positioning rods 22 are extended down to a standable platform 23 that is standable on a surface such as a mantel, a TV, a showcase, a tabletop and a desktop. The magnet-positioning rods 22 can be designed as aesthetical components of the ornament holder 3. Illustrated for example are candy-cane pillars of a guard house for a toy soldier on a Christmas tree ornament. A roof 24 can be provided for enhanced aesthetics. The foot base 18 can rotate in or above the standable platform 23. The ornament holder 3 in this form is, therefore, either standable on standable platform 23 or hangable by attachment means 13 from a desired object. In FIG. 7, there are magnetic elements 11 positioned on magnet-positioning rods 22 as pillars at desired circumferential and radial positions between a top platform 25 and the standable platform 23. On the magnet-positioning rods 22 are magnetic elements 11 that are positioned vertically and alternately below and above magnetically responsive elements 12. The magnetically responsive elements 12 can be embedded into the moveable components 6, here representative of arms 7 and 8, and covered with magnetically conductive material on the arms 7 and 8. With the magnetic elements 11 above and below the magnetically responsive elements 12 turned the same way as shown and with the magnetically responsive elements 12 being magnetically attractive, the top magnetic elements 11 will pull the arms 7 and 8 up and the bottom magnetic elements 11 will pull the arms 7 and 8 down alternately throughout rotational cycles of the rotative ornament 1 that is represented as a toy soldier 2. This causes drumsticks 26 to contact and to move away from a drum 27 alternately in drum-beating simulation.

Alternatively for FIG. 7, the top magnetic elements 11 can be reversed in magnetic polarity and the magnetically responsive elements 12 in the arms 7 and 8 can be magnets with first sides 19 up and second sides 20 down in the relationship shown in FIG. 3. This would compound magnetic attraction for a reciprocative drum-beating motion as the rotative component 1 is rotated by the electric motor 9.

Also in FIG. 7, magnetic elements 11 can be positioned on the ornament holder 3 without magnet-positioning rods 22 if the moveable components 6 are close enough to a top portion of the ornament holder 3. It is only when a portion of the rotative component extends too far for magnetic attraction or magnetic resistance for particular design objectives that magnet-positioning rods 22 need be employed. Attachment of the magnetic elements 11 or magnetically responsive elements 12 to magnet-positioning rods 22 is functionally equivalent to their attachment directly to the ornament holder 3 unless distance for magnetic responsiveness requires use of some form of magnet-positioning rods 22.

Further for FIG. 7, a first leg 28 and a second leg 29 can be caused to reciprocate up and down vertically in a walking, marching or otherwise moveable motion of a bottom set of moveable components 30. Reciprocation of the bottom set of moveable components 30, however, requires counterforce in opposition to magnetic pull of magnetically responsive elements 12 by the magnetic elements 11 as described further in relation to FIGS. 10 and 12–14.

Figure 10:
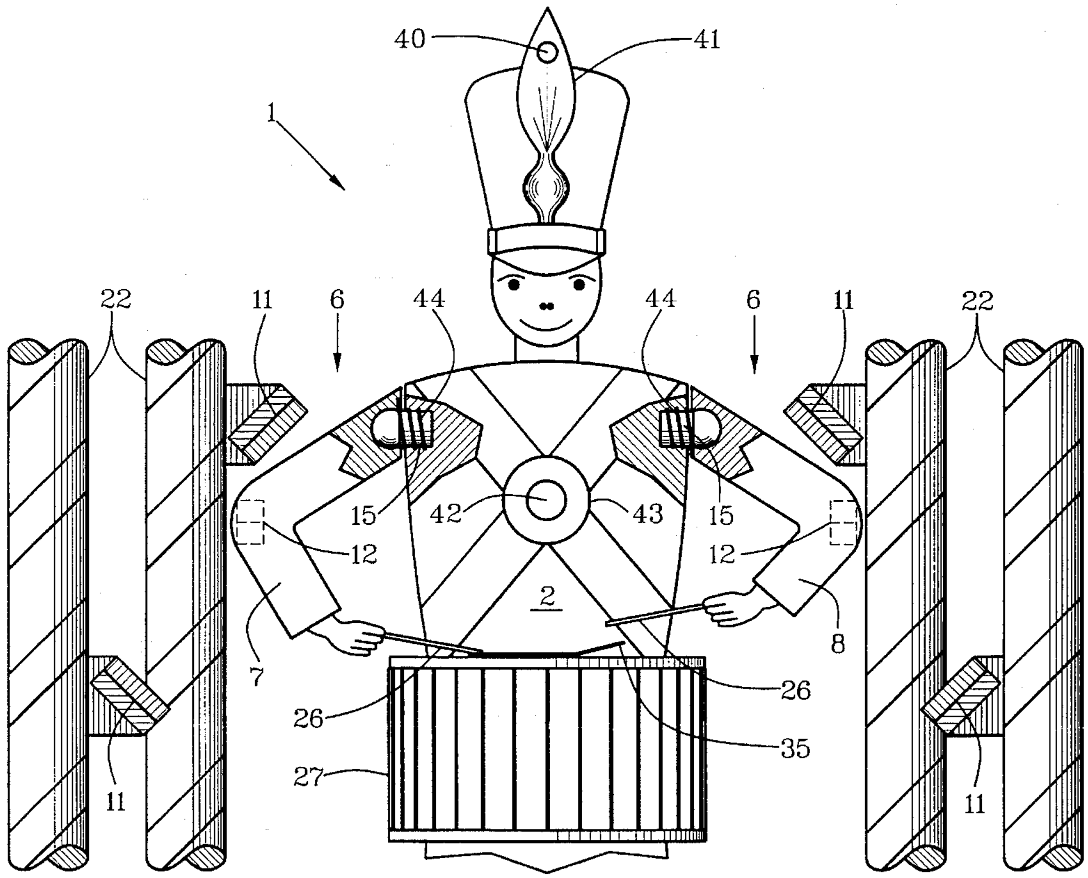
FIG. 10 is a sectional view with increased detail of magnetic relationships in the FIG. 7 illustration and with the addition of counterforce movement of the moveable components in opposite directions from magnetic movement repeatedly in rotational cycles of the rotative component.

Referring to FIGS. 7–10, audio and visual instruments can be operated electrically by movement of the moveable components 6, 7, 8 or 26 described in relation to FIGS. 7 and 10. This can be accomplished through an audiovisual circuit 31 shown in FIG. 8 or through a single-instrument circuit 32 shown in FIG. 9. These are very simple circuits which direct current from a battery 33 through an upstream line 34 to a switch 35 and then through a downstream line 36 to a visual instrument 37 and to an audio instrument 38 for the audiovisual circuit 31. For the single-instrument circuit 32, the downstream line 36 terminates at an optional instrument 39 that can be either audio or visual. A visual instrument 37 can be a small electric light 40 which can be positioned in such desired locations as in a helmet emblem 41 where it can light up the entire helmet emblem 41. The audio instrument 38 can be a small tape player 42 which can be positioned in such desired locations as in a buckle 43 of a uniform on the toy soldier 2. Other animated characterizations than toy soldiers can have similar or different audio instruments 38 and visual instruments 37 positioned where and as desired for different aesthetical effects. The downstream lines 36 are assumed to be positioned and extended appropriately from the switch 35 that can be operated by the drumstick 26 or other moveable component 6 as illustrated in FIGS. 7 and 10.

In FIG. 10 are coil springs 44 positioned on the pivot rods 15 and tensioned circumferentially between the toy soldier 2 and arms 7 and 8 to provide counterforce in opposition to or in assistance of pull of gravity and/or pull of magnetic elements 11. A wider variety of options of magnetic operation is provided with counterforce such as coil springs 44, a leaf spring or a counterbalance weight. One option is to omit either the top or the bottom magnetic elements 11 and utilize the coil spring 44 to operate the arms 7 and 8 as moveable components 6 in opposite directions to pull of magnetic elements 11 for reciprocative movement throughout rotary cycles of the rotative component 1.

Figure 11:
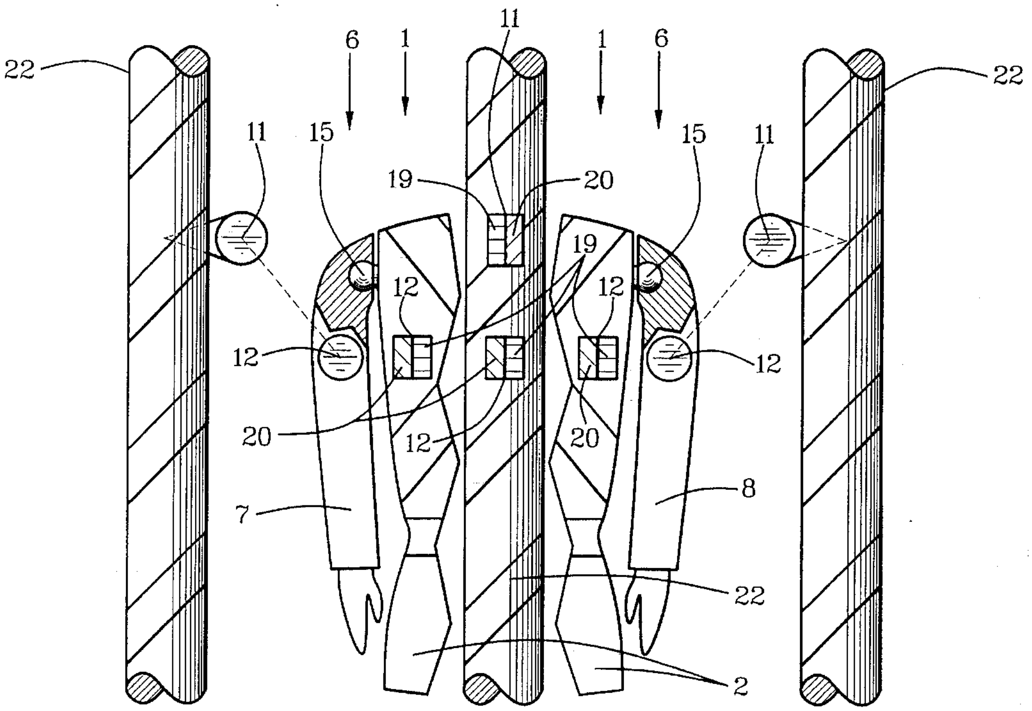
FIG. 11 is a sectional view of a side-to-side positioning of poles of magnets as magnetic elements in magnetic relationship to magnetically responsive elements on opposite sides of moveable components.

Referring to FIG. 11, a very effective oscillatory or reciprocative effect can be achieved with magnetic elements 11 oriented vertically with contact of first sides 19 and second sides 20 in a vertical plane. Magnetically responsive elements 12 also have first sides 19 and second sides 20 that are oriented vertically. Preferably, the magnetic elements 11 are positioned on magnet-positioning rods 22 and the magnetically responsive elements 12 are position on moveable components 6 such as arms 7 and 8, although opposite positioning also will work. Magnetic polarity is illustrated on the magnetic elements 11 and magnetically responsive elements 12 that are positioned on a central magnet-positioning rod 22 between two broken-line halves of a toy solder 2 as a rotative component 1. The magnetic elements 11 are positioned circumferentially at a design distance radially from an axis of the rotative component 1. The magnetically responsive elements 12 on the moveable components 6 are positioned slightly below and can be positioned slightly inward radially from the magnetic elements 11.

Magnetic pull for oscillation occurs in both directions of reciprocation and centrally between both directions of reciprocation. The magnetically responsive element 12 travels from-left-to-right as indicated by three separate positions shown from a side with polarity indication as described in relation to FIGS. 2–4. Magnetic poles of the magnetic elements 11 and the magnetically responsive elements 12 face in opposite directions in separate horizontal planes. The magnetically responsive element 12 is pulled backward from-right-to-left circumferentially due to a same-pole relationship of adjacent positioning of first sides 19 that causes magnetic resistance between the magnetic elements 11 and the magnetically responsive elements 12. This in turn causes an arm 7 or 8 or other moveable component 6 to travel or to swing backward and upward arcuately from-right-to-left while the rotative component 1 is rotating from-left-to-right. As the magnetic elements 11 and the magnetically responsive elements 12 reach and pass vertical alignment, there is a quick pull downward and from-left-to-right circumferentially, first by opposite-pole relationship at an in-line position and then by same-pole resistance of adjacent second sides 20. These conditions occur repeatedly throughout rotative cycles of the rotative component 6 in the form of arms 7 and 8 or such other forms as desired for particular designs of animated rotative ornaments.

Figure 12:
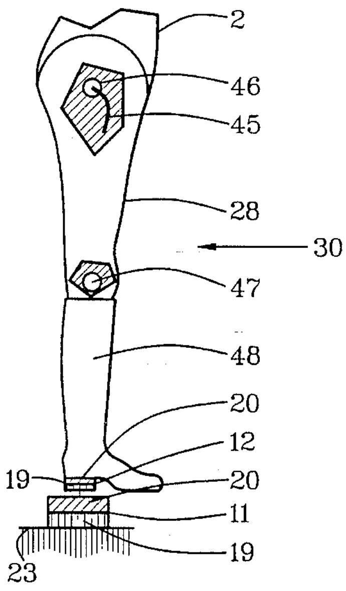
FIG. 12 is a sectional view of a leg as a moveable component with an optional spring as a counterforce in a direction opposite from compounded magnetic attraction of an oppositely-poled magnet as a magnetically responsive element repeatedly during rotative cycles of a rotative component.
Figure 13:
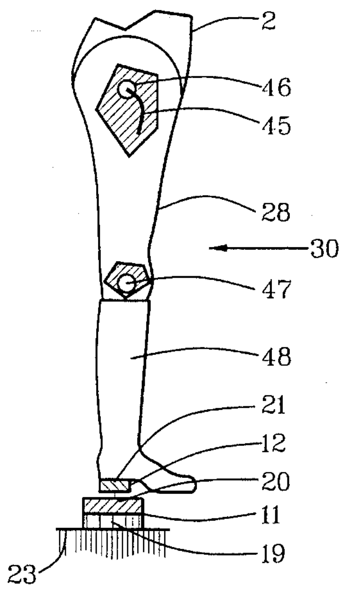
FIG. 13 is a sectional view of a leg as a moveable component with an optional spring as a counterforce in a direction opposite from simple magnetic attraction of a non-magnetized material as a magnetically responsive element repeatedly during rotative cycles of a rotative component.
Figure 14:
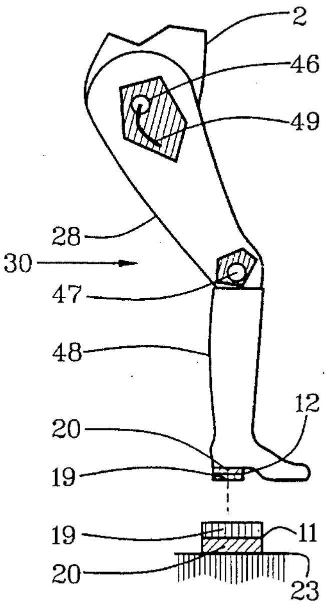
FIG. 14 is a sectional view of a leg as a moveable component with an optional spring as a counterforce in a direction opposite from magnetic resistance of a same-poled magnet as a magnetically responsive element repeatedly during rotative cycles of a rotative component.

Referring to FIGS. 12–14, bottom sets of moveable components 30, such as a leg 28, can be provided with a counterclockwise bottom spring 45 as a counterforce in opposition to pull of gravity and/or pull of a magnetic element 11. As shown in FIG. 12, the counterclockwise bottom spring 45 can be tensioned in counterclockwise-rotative relationship to a leg axle 46 with which the leg 28 is attached pivotally to a rotative component such as a toy soldier 2 or other animated object. The leg 28 can bend at a knee axle 47 to allow positioning of a shoe such as a boot 48 above a magnetic element 11 in response to magnetic pull between a first side 19 of a magnetically responsive element on the boot 48 and a second side 20 of a magnetic element 11 on a standable platform 23 or other surface vertically below the leg 28. As the toy soldier 2 rotates from-left-to-right, magnetic pull is lost due to increase in distance and the counterclockwise bottom spring 45 actuates the leg 28 to a designed attitude similar to that illustrated in FIG. 14. This can be repeated throughout rotational cycles of the toy soldier 2 or other rotative component 1.

In FIG. 13, a non-magnetized material 21 is employed as the magnetically responsive element 12. Other aspects are the same as described in relation to FIG. 12.

In FIG. 14, magnetic polarity of the magnetic element 11 is reversed in relationship to magnetic poles of a magnetically responsive element 12 on the boot 48. First side 19 of the magnetic element 11 is adjacent to first side 19 of the magnetically responsive element 12. The opposite relationship with second sides 20 positioned adjacently is optional. This creates magnetic resistance which necessitates a clockwise bottom spring 49 to push the leg 28 down when not raised by magnetic resistance to achieve a walking, marching or other reciprocative action. For some designs of animated rotative ornaments, this resistance polarity is desirable. For a leg design with a marching action, however, the working relationship described in relation to FIGS. 12 and 13 are preferable.

Various modifications may be made of the invention without departing from the scope thereof and it is desired, therefore, that only such limitations shall be placed thereon as are imposed by the prior art and which are set forth in the appended claims.

What is claimed is:

1. An apparatus for imparting motion to an ornament, comprising:

a holder member, an elongated member depending from and operatively disposed on said holder member, a movable member operatively disposed on said elongated member, a first magnetic member having a first magnetic field, said first magnetic member operatively disposed on said moveable member, a second magnetic member having a second magnetic field, said second magnetic member operatively disposed on said holder member, and motion means for imparting motion to said elongated member to bring said first magnetic field associated with said moveable member into spatial interacting relation with said second magnetic field to thereby produce motion in said moveable member.

2. An apparatus for imparting motion to an ornament, comprising:

a holder member;

an elongated member depending from and operatively disposed on said holder member, a plurality of movable members operatively disposed on said elongated member, a plurality of first magnetic members each having a first magnetic field, at least one of said first magnetic members being operatively disposed on each said moveable member, a plurality of second magnetic members each having a second magnetic field, at least one of said second magnetic members being operatively disposed on said holder member, and motion means for imparting motion to said elongated member to bring said first magnetic field associated with said moveable members into spatial interacting relation with said second magnetic field to thereby produce motion in said moveable members.

3. An apparatus for imparting motion to an ornament, comprising:

a holder member having a defined surface area of predetermined peripheral extent, attachment means projecting from said defined surface area of said holder member, a base platform oppositely spaced from and aligned with said holder member, said base platform having a first surface, an elongated member having a first end and a second end, the second being oppositely spaced from said elongated member's first end, the first end of said elongated member being operatively and connectively disposed to said attachment means, said second end of the elongated member being rotatively disposed to the first surface of said platform, a plurality of columns each having a first end and a second end, the first end of each column being connectively disposed to the defined surface area of said holder member, the second end of each column being connectively disposed to the defined surface area of the first surface of said platform, said columns being in parallel relation with said elongated member, a plurality of movable members operatively disposed on said elongated member, a plurality of first magnetic members each having a first magnetic field, said first magnetic member operatively disposed on said moveable members, a plurality of second magnetic members each having a second magnetic field, said second magnetic member operatively disposed on at least one of said columns, and motion means for imparting motion to said elongated member to bring said first magnetic field associated with said moveable members into spatial interacting relation with said second magnetic field to thereby produce motion in said moveable members.

4. An apparatus as recited in claim 2, further comprising:

said holder member having a defined surface area of predetermined peripheral extent, a base platform oppositely spaced from and aligned with said holder member, a column, having a first end and a second end, the first end of said column being connectively disposed to the defined surface area of said holder member, the second end of said column being connectively disposed to the defined surface area of the first surface of said platform, said column being in parallel relation with said elongated member, and each said magnetic member being disposed on said column.

5. An apparatus as recited in claim 4, further comprising:

a plurality of columns each having a first end and a second end, the first end of each of said columns being connectively disposed to and depending from said holder member, said columns being in parallel relation with said elongated member, and the second end of each of said columns being connectively disposed to said platform.

6. An apparatus as recited in claim 5 wherein said elongated member being detachably disposed on said holder member.

7. An apparatus as recited in claim 6 wherein said means for imparting motion being an electric motor.

8. An apparatus as recited in claim 7 wherein said moveable member being an electrical switch whereby closing said switch causing electric current to flow to predetermined visual means.

9. An apparatus as recited in claim 8 wherein said moveable member being an electrical switch whereby closing said switch causing electric current to flow to predetermined audio means.

* * * * *